June 7, 1932. F. PUENING 1,861,876
LOW TEMPERATURE DISTILLATION APPARATUS
Filed Jan. 7, 1929 9 Sheets-Sheet 1

INVENTOR.
Franz Puening.
BY Jesse R. Langley
ATTORNEY.

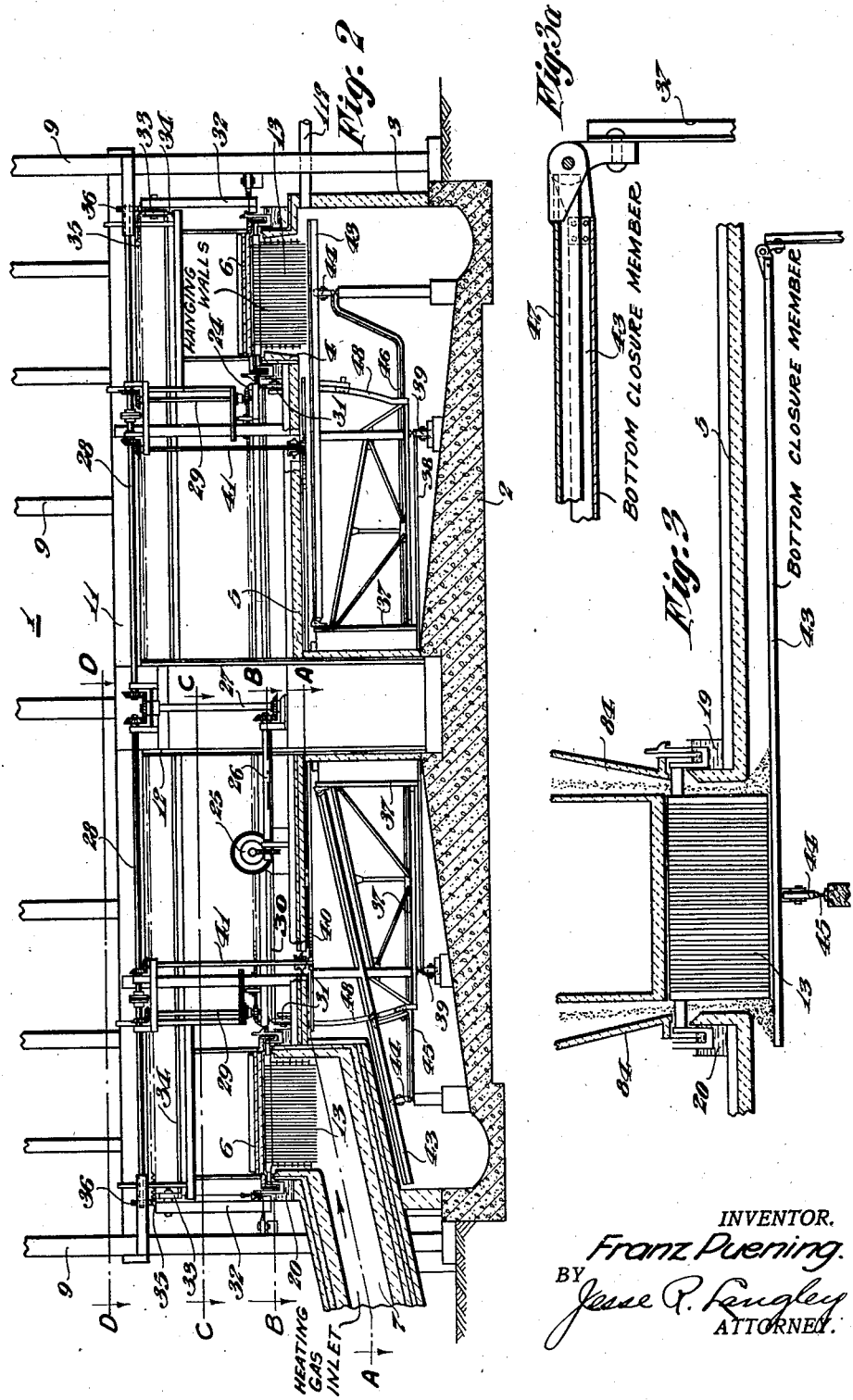

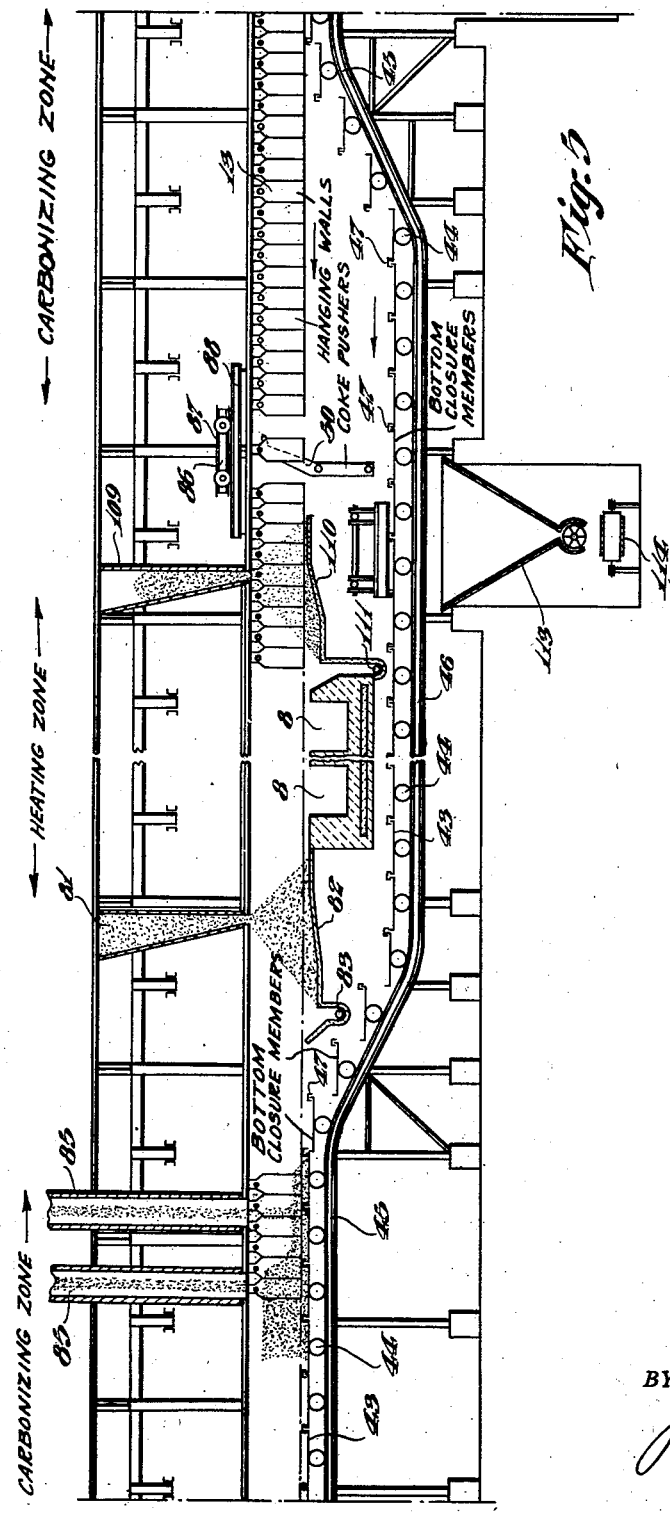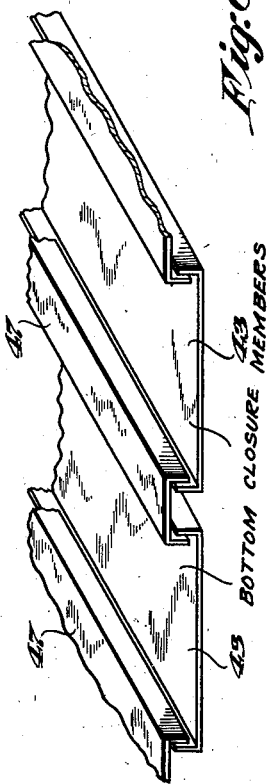

June 7, 1932.   F. PUENING   1,861,876
LOW TEMPERATURE DISTILLATION APPARATUS
Filed Jan. 7, 1929   9 Sheets-Sheet 5

INVENTOR.
Franz Puening.
BY Jesse R. Langley
ATTORNEY.

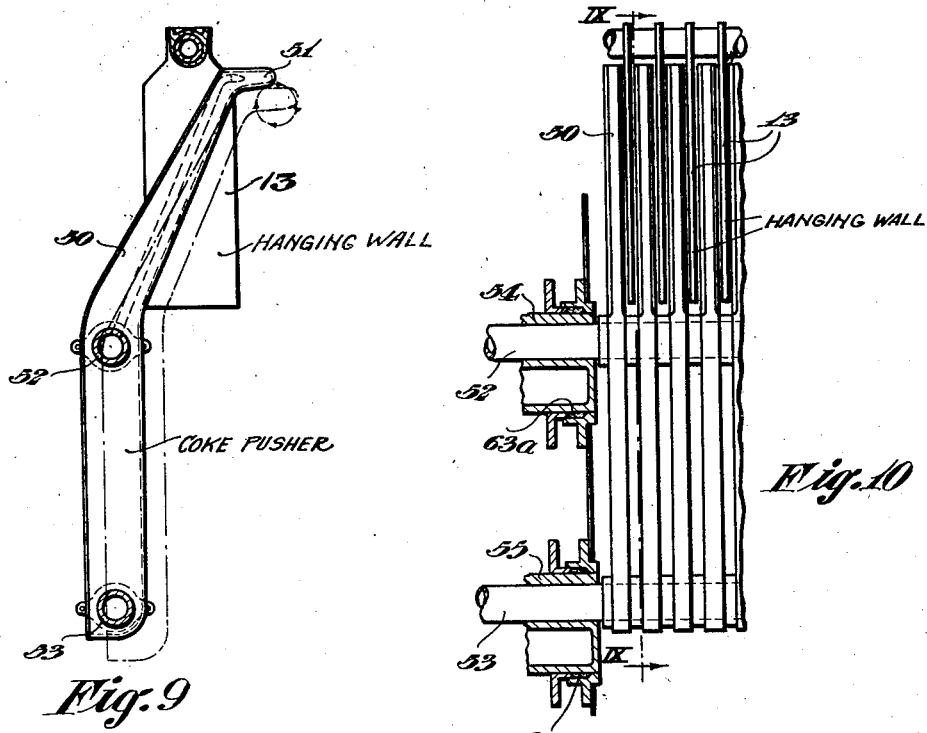
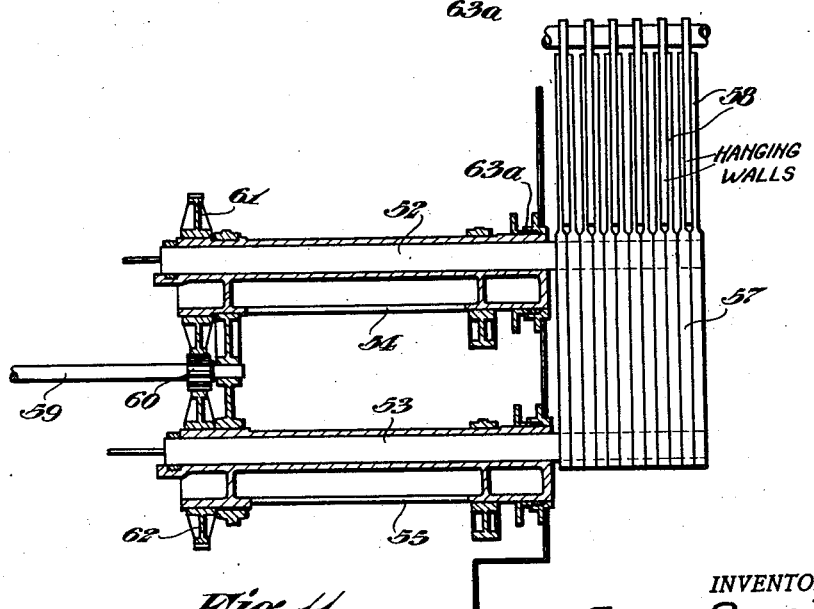

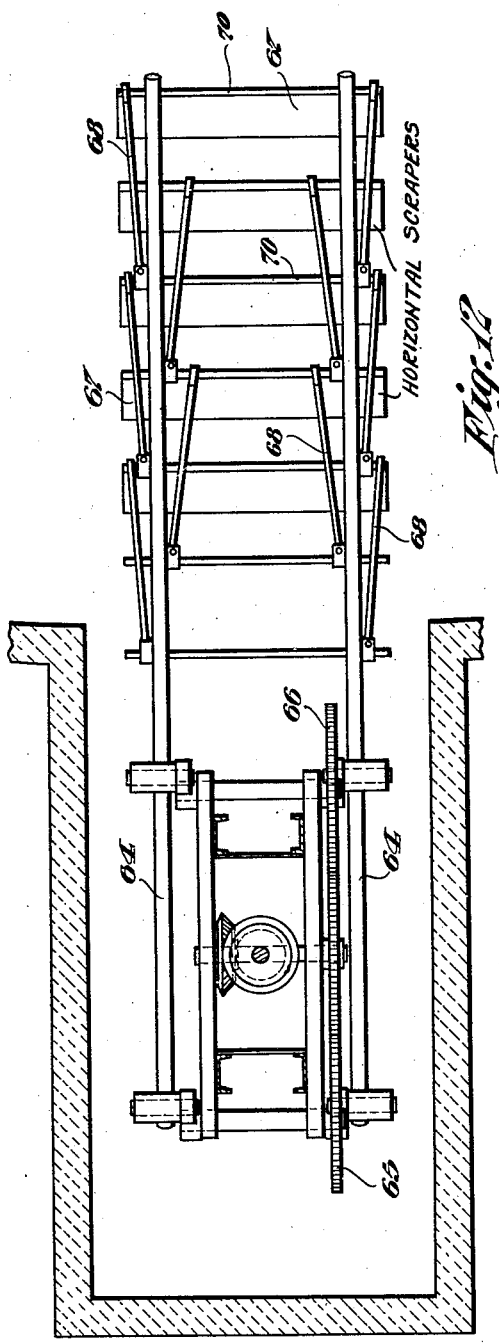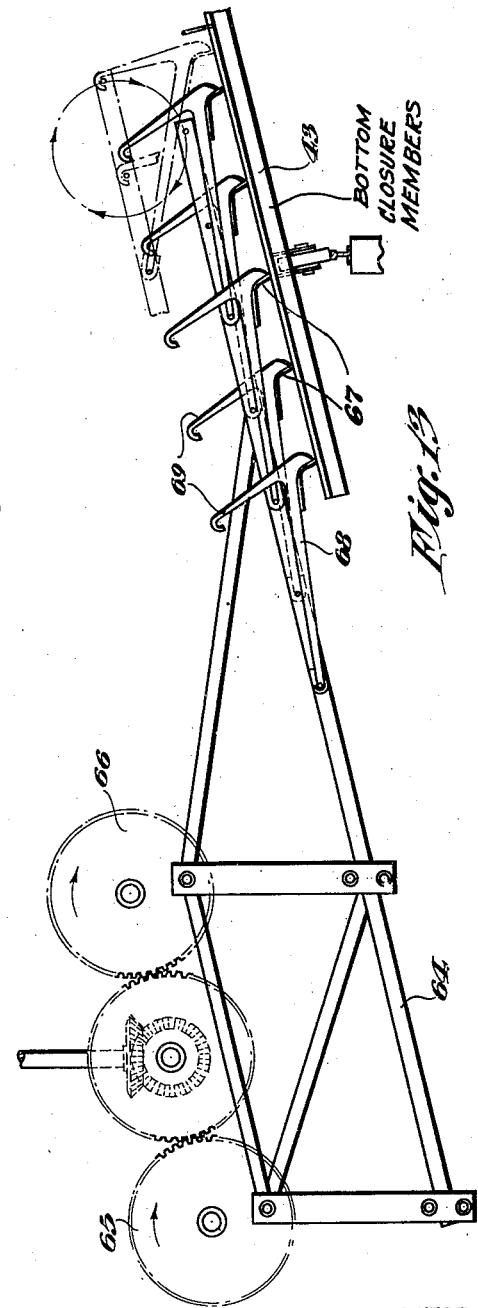

June 7, 1932.  F. PUENING  1,861,876
LOW TEMPERATURE DISTILLATION APPARATUS
Filed Jan. 7, 1929  9 Sheets-Sheet 8
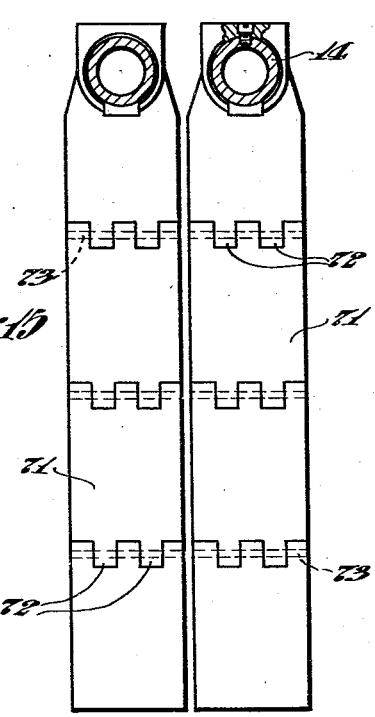
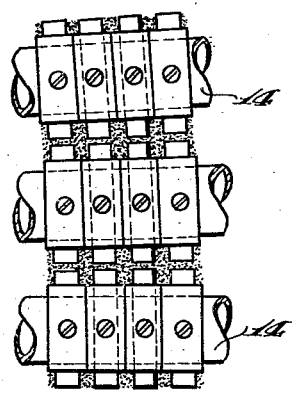
Fig.14  Fig.15  Fig.16
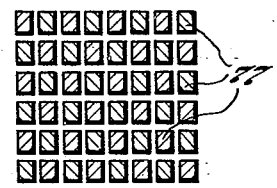
Fig.17
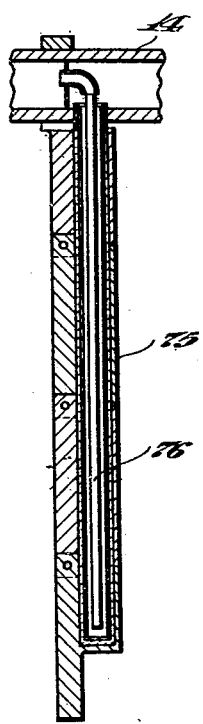
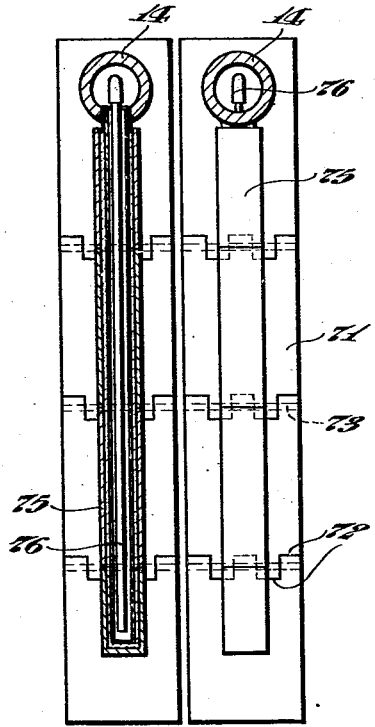
Fig.18  Fig.19
INVENTOR.
Franz Puening.
BY Jesse P. Langley
ATTORNEY.

June 7, 1932. F. PUENING 1,861,876
LOW TEMPERATURE DISTILLATION APPARATUS
Filed Jan. 7, 1929 9 Sheets-Sheet 9

INVENTOR.
Franz Puening
BY Jesse R. Langley
ATTORNEY.

Patented June 7, 1932

1,861,876

UNITED STATES PATENT OFFICE

FRANZ PUENING, OF O'HARA TOWNSHIP, ALLEGHENY COUNTY, PENNSYLVANIA

LOW TEMPERATURE DISTILLATION APPARATUS

Application filed January 7, 1929. Serial No. 330,714.

My invention relates to low-temperature distillation apparatus and particularly to apparatus for producing low-temperature coke and its attendant by-products.

As in a prior invention, the apparatus of my present invention utilizes the principle of continuously rotating circular endless coking chambers into which coal falls continuously and from which coke is continuously removed.

In connection with a prior invention, I have also shown and described vertical hanging walls which are self-aligning. The use of such walls permits the construction of machines of large capacities and they are utilized in the present invention.

The vertical hanging walls of the prior invention are so arranged that they may be separated to facilitate the removal of coke therefrom. This principle has been utilized in an improved manner of construction and operation in the present invention.

One object of my invention is to provide improved apparatus for the continuous low-temperature distillation of coal and other carbonaceous materials.

A further object of my invention is to provide improved low-temperature distillation apparatus in which coking chambers having vertical walls comprising heat-storage devices may be continuously passed through a heating zone and a coking zone successively, and the continuous charging of material to be coked and the continuous discharging of coke may be more easily accomplished.

It is a still further object of my invention to provide improved low-temperature distillation apparatus of such type that its coking chambers can be easily and continuously supplied with material to be coked and the resultant coke may be conveniently and continuously removed therefrom.

It is a still further object of my invention to provide low-temperature coking machinery of the heat-storing type in which the coking walls are economically and safely heated, in which the heating and carbonizing chambers are completely sealed against intermingling of gases, in which the coal is correctly charged into the carbonizing spaces without disturbing their alignment and in which the coal is securely held in position in those chambers and the travel of the charged chambers is not impeded or disturbed.

It is well known that in the low-temperature coking of coal and the like, coke of the highest quality and the highest efficiency of the coking apparatus are obtained when the coal is coked in narrow chambers or retorts of considerable height.

In the preferred form of apparatus embodying my invention, coal or other carbonaceous material is coked between a series of concentric circular walls consisting of heat-storage devices of metal or other refractory material that are externally heated and that are spaced apart to provide very narrow annular concentric coking chambers. The furnace and the ducts for supplying hot gases for heating purposes are stationary, as are the walls for enclosing the movable portions of the apparatus. The heating walls are movable and they pass continuously through the heating zone to which hot gases are supplied.

The heating walls are vertical and are composed of numerous individual elements, each suspended from its top and hanging vertically, thus eliminating the possibility of the development of bending stresses. All individual elements are suspended from artificially cooled beams which therefore are not subject to the reduction in strength caused by elevated temperatures to which the individual heating elements will be raised.

The coal-handling mechanism is adapted to continuously supply coal to be coked to the annular concentric coking chambers immediately after the heat-storage devices constituting the heating walls pass through the heating zone. Coke-removing devices are located at the point in the travel of the coking chambers at which the coking is completed to continuously remove the coke therefrom.

The movable hanging walls are in general composed of a series of iron or other refractory elements that are preferably composed of several dependent parts that are flexibly connected for relative movement in order that they may freely maintain their vertical alignment. The heating gases pass freely through the coking chambers which are open at their bottoms but are covered at their tops by the roof of the heating chamber during the passage of the heating walls through the heating zone.

The vertical suspension of the heating elements guarantees continued vertical alignment of the elements because any interior stresses that may remain or other influences which might tend to warp the elements will gradually disappear by reason of the annealing temperature to which they are exposed, and by reason of their being suspended vertically.

Elements that are even slightly bent at the beginning of operation will, therefore, become straight and the only effect of the gradual flow of the metal at the high temperatures is to gradually lengthen the elements. This change, however, is not serious by reason of the arrangement of the parts of the improved apparatus. Vertical alignment is also insured by the flexible connection of the parts of the individual elements.

The details of my invention will be described in connection with the accompanying drawings in which similar numerals designate corresponding parts.

Fig. 2 is a vertical sectional view taken on line II—II of Fig. 1;

Fig. 3 is a vertical sectional view of a portion of the apparatus taken on line III—III of Fig. 1;

Fig. 3a is a vertical sectional view of details of the connections of certain members;

Fig. 5 is an exterior development of a vertical sectional view illustrating the successive phases of discharging coke, heating the hanging walls and charging of the movable coking apparatus, parts being broken away;

Fig. 6 is an enlarged detail view of a portion of certain of the bottom closure members for the coking chambers;

Fig. 9 is a sectional view taken on line IX—IX of Fig. 10;

Fig. 10 is an enlarged view of coke pushers of modified form and certain related apparatus;

Fig. 11 is a view partially in elevation and partially in section of certain of one form of coke pushers in position between the heating walls, together with the operating mechanism for the pushers;

Figs. 12 and 13 are respectively plan and side elevational views of the coke-scraper mechanism and associated parts;

Figs. 14 and 15 are respective views partially in elevation and partially in section of certain of the heat-storage devices;

Fig. 16 is a plan view of certain of the heat-storage devices with material in position to be distilled;

Fig. 17 is a reduced horizontal sectional view of an assembly of a number of heat-storage devices of modified form;

Fig. 18 is a vertical sectional view of a member of an outer heating wall;

Fig. 19 is a view partially in elevation and partially in section of two adjacent outer wall members;

Figure 1:
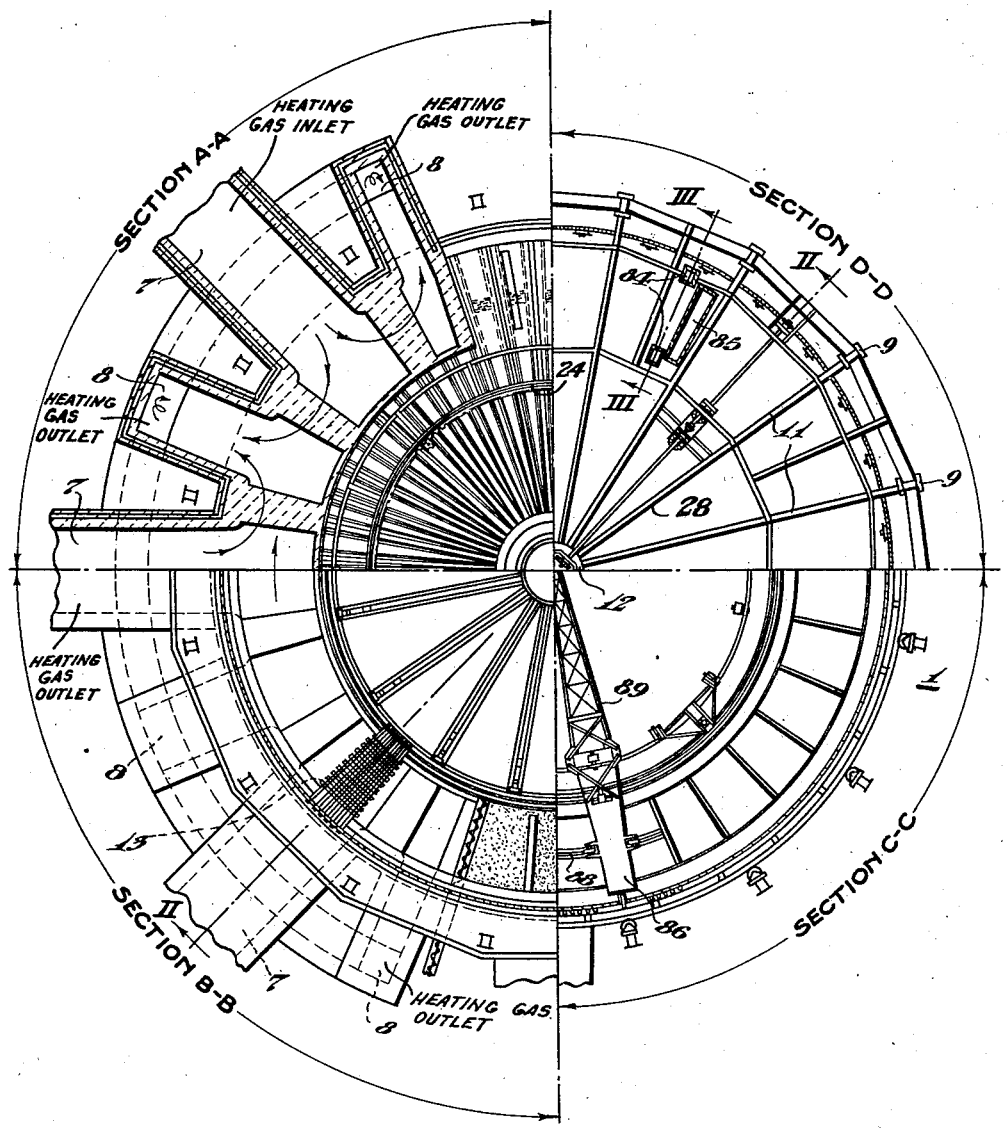
Figure 1 is a horizontal sectional view taken partially on the several lines A—A, B—B, C—C and D—D of Fig. 2.

Referring particularly to Figs. 1 and 2, low-temperature coking apparatus 1 constructed in accordance with my invention comprises a foundation 2, a circular outer wall 3, a similar inner wall 4, a roof 5 of refractory material for the inner portion of the operating mechanism, and an annular roof 6, also of refractory material, for covering the coking chambers. A furnace, not shown, supplies hot gases for heating through ducts 7, the heating gases being returned through ducts 8 that alternate with the ducts 7. While any desired number of ducts may be employed, three supply ducts 7 and four outlet ducts 8 are illustrated.

Around the outer wall 3 is a row of upright posts or beams 9 that support the superstructure of the coking apparatus. A radially-extending beam 11 is connected at its outer end to each of the vertical posts 9 and at its inner end to a central supporting structure 12. From the beams 11 are suspended the various portions of the superstructure, including that for supporting the roof 6 for the coking chambers.

Figure 4:
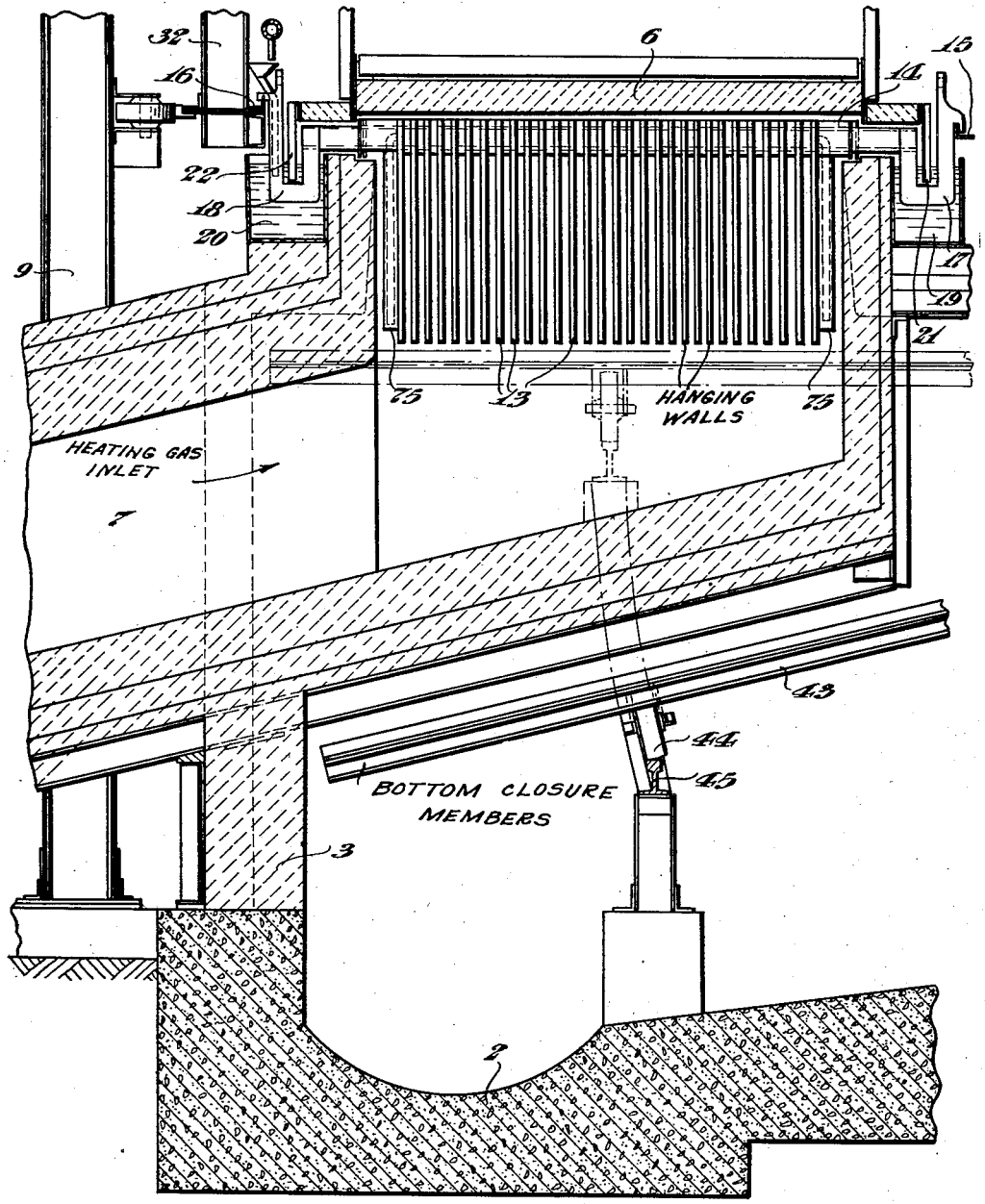
Fig. 4 is a vertical sectional view of a portion of the apparatus including one of the heating ducts.
Figure 8:
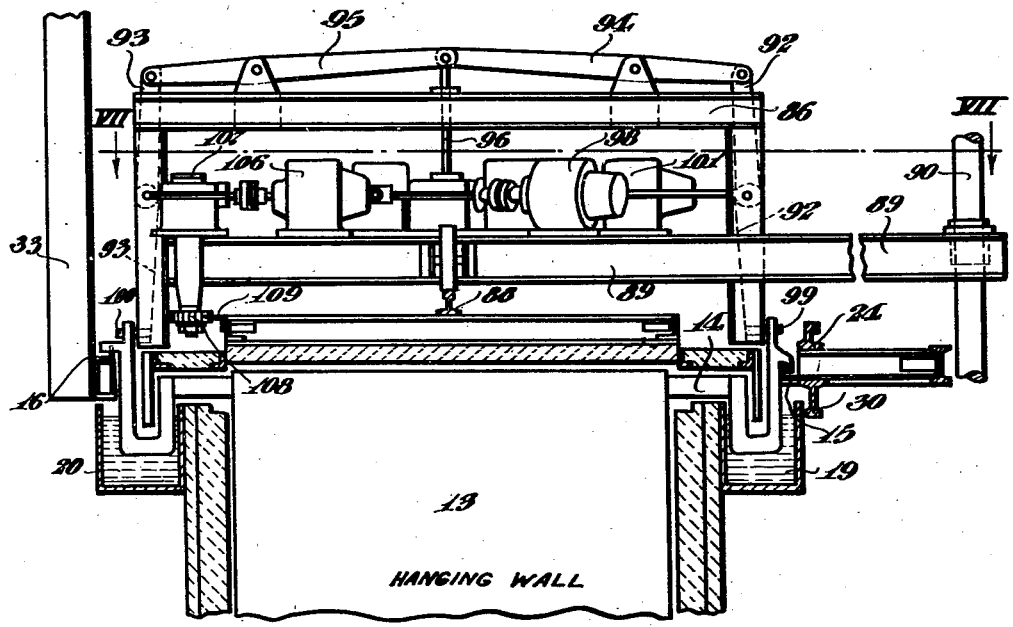
Fig. 8 is a view partially in elevation and partially in vertical section of the mechanism of Fig. 7 and certain related parts.
Figure 20:
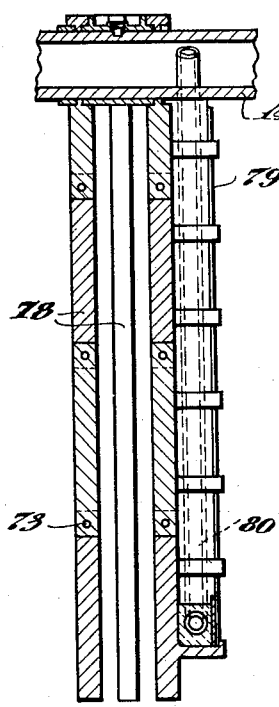
Fig. 20 is a vertical sectional view illustrating a modified form of wall member.

As best shown in Figs. 4 and 8, the movable portions of the apparatus comprise a series of concentric heated hanging walls 13 that are mounted on radially-extending beams 14 carried by annular girders 15 and 16 which are serrated or notched to provide seats for projecting portions of U-shape members 17 and 18 with which the ends of the beams 14 are respectively provided. The notches serve to accurately position the beams.

The members 17 and 18 respectively extend through water seals 19 and 20 to the exterior of the enclosed space covered by the roof 6. The roof 6 is also connected to the water seals 19 and 20 by means of downwardly projecting plate members 21 and 22.

This arrangement of the seals and cooperating parts provides that the beams 14 and the connected hanging walls 13 may move in a circular path relative to the outer wall 3 and the roof 6 without permitting leakage of distillates to the atmosphere or the entrance of air to the enclosure.

The annular girder 15 is connected to an annular rack 24 that is driven by a mechanism comprising a driving motor 25 that is operatively connected to a horizontal shaft 26, a vertical shaft 27, two horizontal shafts 28, and two vertical shafts 29 that are geared to the annular rack 24 at diametrically opposite points. The rack 24 and its connected parts are provided with an inverted rail 30 that operates on rollers 31.

The girder 16 is carried by a series of upright beams 32, each of which is provided with a roller 33 for operation on a circular rail 34. The beams 32 are connected to an annular rack 35 that is driven by the motor 25 through the shafts 26 and 27 and shafts 28, each of the latter having a gear 36 that is connected to the rack 35.

Beneath the inner roof 5 and surrounding the central upright stationary structure 12 of the apparatus is a rotatable framework 37 having an inverted rail 38 that operates on rollers 39 supported by the foundation 2.

The framework 37, which may be constructed of structural steel, is provided with an annular rack 40 that is driven from the motor 25 by means of vertical shafts 41, each of which is connected at its upper end to one of the horizontal shafts 28 and at its lower end to the rack 40.

The framework 37 carries a comparatively large number of radially-extending closure members 43 for the bottoms of the coking chambers. As shown in Figs. 2 and 3a, each of the members 43 is pivotally connected at its inner end to the framework 37 for vertical movement with respect thereto. As shown in Figs. 2, 3, 4 and 5, each member 43 is provided with a roller 44 which operates on a track 45 having a depressed portion 46 extending under the ducts 7 and 8.

As best shown in Fig. 6, the spaces between the flanged edges of the closure members 43 are covered by channel members 47 that are also pivoted to the framework 37, as shown in Fig. 3a. The vertical movements of the closure members 43 and cover members 47 are controlled by guide members 48, certain of which appear in Fig. 2.

Reference may now be had to Figs. 9 and 10, in which the details of the coke-pusher mechanism are illustrated. Between each pair of adjacent hanging walls 13 is an inclined bar 50 having a tapered projection 51 that is mounted upon two shafts 52 and 53, the shaft 52 being substantially central of the body of the coke pusher and the shaft 52 being at the lower end of the pusher. Each of the pushers 50 is of such width as to engage the sides of the hanging walls between which it is interposed and the forward edge of the coke-engaging portion is beveled, as indicated in Fig. 10.

The shafts 52 and 53 are mounted in eccentrics 54 and 55, which cause each of the pushers 50 to oscillate between the full-line position shown in Fig. 9 and the position indicated by dotted line. Any given point on each of the pushers 50 rotates in a circle, as indicated in the upper portion of Fig. 9.

A modified form of pusher mechanism is illustrated in Fig. 11, the principal difference being that each pusher 57 is bifurcated whereby a separate member 58 engages each surface of the hanging wall. The details of the operating mechanism are also illustrated and these are similar to those of the form shown in Figs. 9 and 10. A shaft 59 is provided with a gear 60, which meshes with gears 61 and 62 for oscillating the shafts 52 and 53 that are mounted in the eccentrics 54 and 55. By reason of the operating mechanism being similar in construction and arrangement to that of Figs. 9 and 10, the paths of movement of the pushers 57 are similar to those of the pushers 50. The shafts 52 and 53 are preferably extended through stuffing boxes 63a in the wall 3 and driven by any suitable motive device.

A mechanism for moving the coke from the closure members 43 and the cover members 47 when they are in their lowermost positions is illustrated in Figs. 12 and 13. A framework 64 is pivotally connected at its upper portion to two similar gears 65 and 66 that are rotated in the same direction and at the same speed whereby the framework 64 is operated in a circular path, in which the various positions of the parts are always in parallel. The frame is provided with five horizontal scrapers 67 that are oscillated by means of the framework 64 to remove substantially all of the coke from the tops of the members 43 and 47 while the latter are passing through the coke-removing zone.

Each of the scrapers 67 is pivotally connected to the frame by means of a bar 68 and each of the scrapers is also provided with an upwardly extending hook member 69 for engaging a rod 70 when the framework 64 is substantially midway between its uppermost and its lowermost positions. This arrangement results in the lifting of the scrapers 67 through only the latter half of the upward travel of the framework 64 and insures a considerable longitudinal movement of the scrapers while in engagement with the coke on the members 43 and 47. Accordingly, the effect is to draw the coke to the left in successive steps and to lift the scrapers 67 while they are being actuated to the right to be placed in position corresponding to that indicated by the dotted lines.

Each of the circular hanging walls 13 consists of a comparatively large number of relatively narrow metal or refractory members 71 that are supported at their tops by the radially-extending beams 14. As shown in Figs. 14 and 15, each of the members 71 is composed of a plurality of depending parts having notched adjacent edges, the various projecting parts 72 of which are hingedly connected by means of rods 73. The upper section of each member 71 is provided with a collar 74 that is thicker than the member 71 whereby the latter are spaced from each other when the collars 74 are in engagement. The radial series of members that are carried by each of the beams 14 may be separated somewhat as shown in Figs. 16 and 17 whereby some of the material to be coked may enter the spaces between the edges of the members 71.

The number of heating walls which corresponds to the number of members 71 upon each of the water-cooled beams 14 may be as desired, thirty being shown by way of example.

As shown in Fig. 4 and in enlarged detail in Figs. 18 and 19, the members constituting the outer walls differ from the members 71 of the intermediate walls in that they are provided with bracing members 75 within which are pipe 76 for the circulation of cooling water. The purpose of the bracing members is to insure that the outer walls will remain rigidly in vertical alignment in order that the remainder of the walls may not be deformed when coal is charged into the coking chambers provided by the spaces between the hanging walls.

As shown in Fig. 17, the dimensions of the wall members may be modified in order to provide coking spaces between their edges as well as between their sides. The members 77 are nearly square in horizontal cross-section and the transverse and the longitudinal coking spaces are of substantially equal width. This arrangement permits heating gases to be conducted horizontally and radially through the spaces between the members 77 as well as circumferentially.

Figure 21:
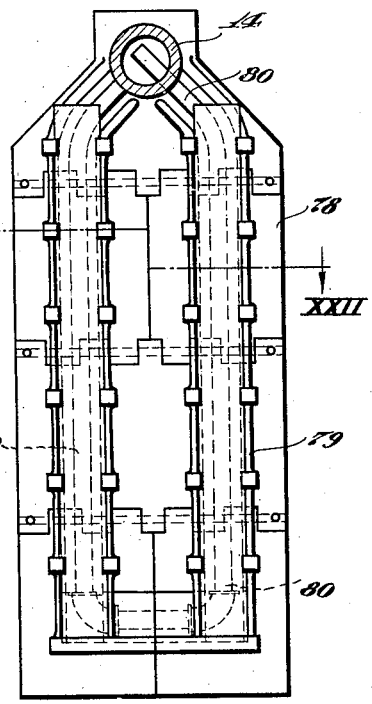
Fig. 21 is a view partially in section and partially in elevation of the modification of Fig. 20.
Figure 22:
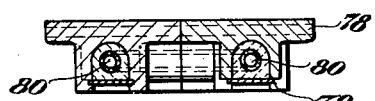
Fig. 22 is a view in horizontal section taken on line XXII—XXII of Fig. 21.
Figure 23:
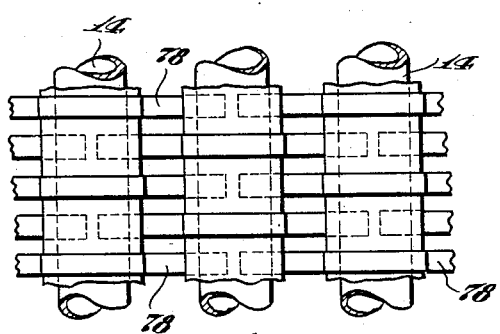
Fig. 23 is a top plan view of certain wall members of modified form in assembled positions.

Reference may now be had to Figs. 20, 21, 22 and 23, in which a modified form of elements for the hanging walls are illustrated. They differ principally from the members 71 previously described in that they extend for substantially double the circumference of the hanging wall, as shown in Fig. 23. The modified members 78 extend from the beam 14 by which they are suspended in each direction to the central portion of the adjacent beam 14, the members 78 of adjacent beams being staggered whereby they overlap. When this form of member is employed, there is only one end member in each row on alternating ends which constitutes the outer wall and this is of similar width, as shown in Figs. 21 and 22, and is provided with a bracing member 79 having a pipe 80 for circulating cooling water therethrough.

The remaining details of the apparatus of my invention will be described in connection with the operation of the apparatus.

It may be assumed that the driving motor 25 is driving the various moving parts at the same angular speeds. In other words, the girders 15 and 16 for carrying the beams 14 of the hanging walls 13 and the framework 37 are rotating in unison in order that the co-operating parts will have the same uniform angular velocity. It may be assumed further that hot gases are being supplied through the supply ducts 7 and that the portions of the hanging walls 13 that are in the heating zone are being heated as hot gases flow out of the several ducts 7 and upwardly into the spaces between the hanging walls, the currents of gases dividing from the several ducts and flowing in either direction adjacent to the roof 6, downwardly through adjacent spaces and out through the several outlet ducts 8.

The hanging walls then pass beneath a downwardly moving stream of coke dust or coke breeze, indicated at 81 in Fig. 5. This stream of fine coke is of sufficient width to form a wall that effectually seals the heating zone on the forward side thereof from the remainder of the apparatus. As shown in Fig. 5, the coke breeze passes through the heating walls and is discharged to a heat-insulated floor 82 from which it is actuated or falls into a trough for removal by a conveyor 83. The coke breeze thus used for the seal is recirculated for repeated use by any well-known means.

The temperature of the recirculated coke dust is maintained so high that the tar vapors distilled from the coal cannot condense into it, with the result that the coke dust retains its loose granular condition. This elevated temperature of the coke dust is easily maintained because the coke dust always acquires heat from the hanging walls and because the dust recirculating means are well insulated against loss of heat.

When the walls approach the coal-charging position, the outer sides of the outer walls are sealed by coke breeze as shown in Fig. 3 from relatively small chutes 84 slightly preceding the coal chute 85.

When the hanging walls are beneath the chute 85 which extends the width of all of the coking chambers, a limited amount of coal is supplied to the coking chambers between the several hanging walls which are at this time provided with bottom retaining members in the form of the closures 43 and 47. As shown in Fig. 5, this initial amount of coal fills the carbonizing spaces to a relatively slight depth and is merely sufficient to secure the lower ends of the hanging elements against swinging out of alinement before the spaces are completely filled. The spaces are then filled to the desired level by a second coal chute 85. This process continues and the heating walls that have been charged with coal continue to move around the circumference of the apparatus at such speed that the coal will be completely coked before it reaches a point at which the coke is to be discharged.

The quantity of coal supplied to the coking chamber is accurately measured so that it fills the coking spaces only to a level well below the artificially cooled radial beams from which the heating elements are dependent. The distance between the top level of the coal and the thickened portion at the upper end of the hanging elements is several inches. This provision has the advantage that quick carbonization of the coal is not prevented by the proximity of the beams and the roof which have a cooling effect and it has the additional advantage that the uppermost tips of the coke-removing plows find ready and unobstructed entrance above the coal and coke level, whereby ejection of the coke is facilitated. Any known measuring device can be used to measure the quantity of coal at the charging point, as for instance rotating star wheels, traveling belts or reciprocating devices, all commonly used in carbonizing plants.

Referring particularly to Fig. 5, a portion of the path of the heating walls during which coking occurs has been omitted as there is no change in the relative positions of the various wall members, the only change occurring being the progress of the distilling operation. The hanging walls that are shown at the right in Fig. 5 are moving toward the left and are approaching the zone in which the coke is to be discharged. The bottom closure members 43 are approaching the depressed portions 46 of the track or ramp 45. The various positions of the closure members 43 are shown along the track 45, the cover members 47 being carried respectively by the uppermost of the pair of closure members 43, with which it co-operates.

Figure 7:
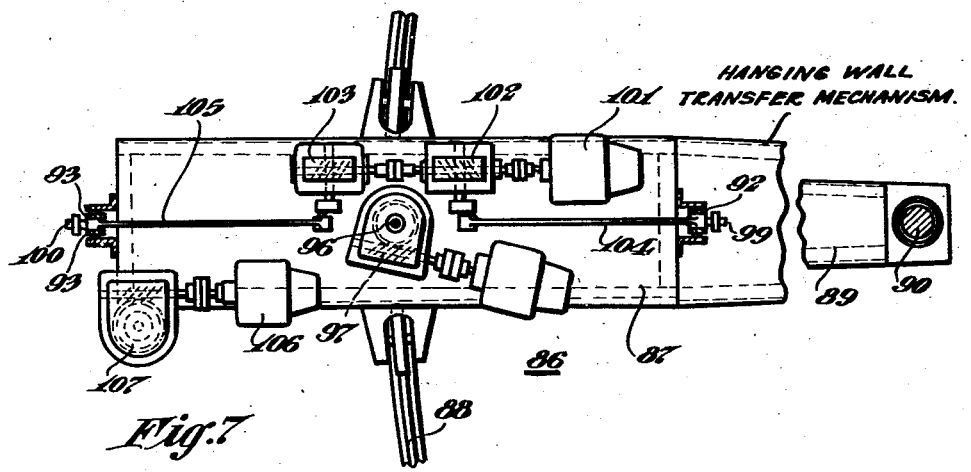
Fig. 7 is a view in horizontal section on line VII—VII of Fig. 8 of the transfer mechanism for the heat-storage devices and the motive devices therefore, parts being broken away.

The lowering of the bottom closure members 43 will permit a certain amount of the coke to fall from the coking chambers between the hanging walls and this will be carried forward by the closure members. As the various members 71 of the hanging walls approach the coke pushers, one of which is indicated at 50, the several beams 14 with the members 71 carried thereby are moved forward by a transfer mechanism 86 illustrated in Figs. 7 and 8.

The transfer mechanism 86 comprises a truck 87 that is mounted on a suitable track 88 for forward and backward movements along the path of the hanging walls 13. The truck 87 is guided in its movement by a structural framework 89 that is pivotally connected to a central upright post 90. The truck 87 is provided with two upright arms 92 and 93 that are pivoted at their upper ends to pivotally mounted beams 94 and 95, respectively, the inner ends of the beams 94 and 95 being pivotally connected to a vertically movable rod 96 that is connected by a worm-gear mechanism 97 to a motor 98 which may be, for example, an electric motor.

The lower ends of the uprights 92 and 93 are provided with outwardly projecting pins 99 and 100 for respectively engaging the U-shape members 17 and 18 when uprights 92 and 93 are actuated outwardly by means of a motor 101, worm-gear mechanism 102 and 103 and rods 104 and 105 that have an eccentric connection at their inner ends and are connected at their outer ends to a substantially central portion of the uprights 92 and 93. The truck 87 is driven by a motor 106, a worm-gear mechanism 107 and a gear 108 that meshes with a rack 109.

The operation of the transfer mechanism is as follows:

When the foremost beam 14 with its elements 71 has arrived at the position at which it is to be transferred, the motor 101 operates the uprights 92 and 93 to engage the U-shape members 17 and 18. The motor 98 then operates to draw the rod 96 downwardly and thereby lift the U-shape members 17 and 18 from the recesses or notches in the annular girders 15 and 16. The motor 106 then operates to drive the truck in a clockwise direction, as viewed in Fig. 1, or to the left, as viewed in Fig. 5, and any coke that remains in contact with the side walls of the several elements 71 is removed as they pass the coke pushers 50, the coke pushers being located intermediate the path of movement of the transfer mechanism 86.

When the section of the walls that is being transferred reaches the limit of its forward movement, that is, in position behind the section previously transferred, the motors are operated successively in the reverse directions to lower the members 17 and 18 and their connected parts into engagement with the next unoccupied notches of the annular girders 15 and 16, the transfer mechanism is disconnected therefrom and the truck returns for the succeeding section of the walls. The motors 98, 101 and 106 may be controlled either manually or by any suitable automatic sequence control device in accordance with well-known electrical practice.

The effect of the advancement of the beams 14 and the wall sections suspended therefrom is to create a gap equivalent to two or more sections of the walls in the annular ring of concentric coking chambers constituted by the hanging walls.

The transfer of the wall sections thus facilitates the removal of coke from the sections of coking chambers between the wall members that are being transferred since an open space is provided in the rear of the transferred sections into which the coke may be ejected. For example, the motors 98, 101 and 106 may be suitably controlled by automatic electrical devices actuated by automatic clock work similar to that used in the automatic operation of other gas-making machinery, for instance, water-gas machines, or the transfer operations may be executed by water or compressed air driven pistons operated automatically in a manner similar also to other automatic machinery used in water-gas manufacture.

When the beams 14 and the corresponding wall sections have been transferred, they continue the gradual movement at their normal rate. The closure members 43 which have descended the inclined portion of the track 45 now pass under the scraper mechanism and substantially all of the coke on the upper surfaces of the closure members is removed by the progressive or step-by-step actuation of the several scrapers.

The several sections of the heating walls then pass under a chute 109, from which flows a column of coke breeze that seals the heating zone from the distilling zone in the manner previously described in connection with the seal 82. The coke breeze constituting this seal flows downwardly through the coking spaces to a floor 110 from which it is actuated or flows into a trough for removal by a conveyor 111 and subsequent recirculation.

The wall sections then pass through the heating zone wherein they are heated to such temperatures by the hot gases circulated through the ducts 7 and 8 that sufficient heat is stored therein for the coking of coal during the succeeding cycle.

The distillate gases are withdrawn from the space surrounding the coking walls 13 by suitable outlet ducts 112 through the wall 3, one of such ducts being illustrated in Fig. 2.

The coke that is removed from the coking walls by the scraper mechanism falls into a hopper 113, from which it is removed to a conveyor belt 114, which transports it to any suitable storage device.

The apparatus operates in the manner described to continuously supply coal to the moving coking chambers formed by the traveling hanging walls and coke is continuously discharged from the apparatus at the completion of the coking cycle. The gases of distillation are also withdrawn continuously and they may be treated in the manner usual for by-products of this character.

The great masses and weight of the hanging elements and beams and annular girders have a steady motion that is not interrupted by stops for the operation of the coke-discharging mechanism. Acceleration and retardation of these heavy masses is avoided with resultant economy of power. Only one of the beams with its dependent elements is being accelerated and retarded at the location of the coke-removal station.

The provision of the coke dust seals immediately before the hanging walls enter the heating zone and immediately after the walls leave the heating zone effectually separates the heating gases from the gases of distillation but at the same time permits the transition of the moving walls from the distillation zone to the heating zone and vice versa.

The coke produced by my improved apparatus will be of good quality because the heating walls are stationary relatively to the coal and the coke is, therefore, produced under conditions that are substantially similar to those of stationary coking chambers. The length of the heating and coking cycle may be easily and conveniently regulated in accordance with the character of the fuel being treated since the coking period may be varied by simply changing the speed of the driving motor.

The furnace for supplying hot gases to the heating zone is separate from the coking apparatus and, therefore, may be regulated as desired to maintain the heating walls at the desired temperature which may, of course, vary somewhat with the nature and properties of the coal or other carbonaceous material being treated. The heating gases are brought into contact with the hanging elements from below and are removed downwardly. In case an arrangement similar to Fig. 17 is used, they may also be brought into the spaces between the elements horizontally from the side, passing through these spaces horizontally and leaving again to the side. Substantially no gases pass through the spaces between the radial beams from which the elements are depending. In this manner the quantity of heat absorbed by the beams which are artificially cooled is greatly reduced with resultant heat economy of the apparatus and extended life of the beams.

The elements that are suspended from the radial pipes and that constitute the annular heating walls will tend to retain their vertical alignment both because they are suspended from the tops thereof and because of the flexible connection of the series of parts of which they are composed. Moreover, any temporary tendency of the elements to be warped will be overcome by the influence of their weight when they are heated to their maximum operating temperatures.

The bottom closures which pass below the heating zone enclosure travel with the hanging walls. This arrangement eliminates friction that would result in case of a stationary floor being employed. This provision has the advantage that the machine is easily rotated and that the hanging elements are not thrown out of vertical alignment by the friction between their lower ends and the bottom closures. The circular carriage provided for the coal-supporting doors rotates in a plane below the circular heating walls and the furnace, and a reliable method is thus provided to return the doors to the hanging elements when they re-enter the carbonizing zone. The extension of the closure beyond the outer hanging wall provides a support for the coke dust or coal used as a seal. The angular upward movement of the wall sections as they are advanced by the transfer mechanism facilitates the disengagement from adjacent sections that are filled with coke.

The operation of my improved coking apparatus may be accomplished with minimum labor and supervision since substantially all of the functions of charging and discharging the apparatus are performed by power-operated mechanisms, some or most of which being automatically controlled.

While I have shown and described the apparatus of my invention as embodying the preferred form of its various elements, it will be understood that various changes and modifications may be made therein without departing from the spirit of my invention. For example, the elements 71 of the hanging walls may be of refractory material such as clay, carborundum or sillimanite instead of steel or iron. Such wall members are shown and described in connection with a prior invention.

If the material being carbonized contracts to a considerable degree, the gap in the heating walls and the transfer mechanism may be omitted as the coke will tend to fall from the coking spaces when the bottom closures are removed. In such case it may also be possible to omit the notches on the girders 15 and 16 as the various wall sections will tend to retain their relative angular positions.

In case it is not undesirable for coal to be mixed to some degree with the coke, the seal that is provided by the chutes 84 for the outer surfaces of the outer walls may be provided with coal instead of coke breeze, as has been described in connection with the operation of the apparatus. In such case, it would be desirable to remove most of the coal before the coke was removed.

Other modifications and changes will be apparent to those skilled in the art relating to coking apparatus. My invention is not to be limited, therefore, except as expressed in the claims.

I claim as my invention:

1. Coking apparatus comprising a series of movable vertical heat-storage members horizontally spaced to provide coking chambers therebetween, said series of members having a gap therein, means for advancing certain of said members simultaneously across said gap and means for removing coke from said members while they are being so advanced.

2. Coking apparatus comprising a series of vertical walls horizontally spaced to provide coking chambers therebetween and mounted for movement in a horizontal path, means for providing a heating zone and a carbonizing zone for said movable walls, said zones comprising portions of the path of movement, said walls having a gap therein at the final end of the carbonizing zone traversed by said walls, means for advancing portions of at least some of said walls across said gap and means for discharging coke from said portions while the latter are being moved across said gap.

3. Coking apparatus comprising a series of vertical walls horizontally spaced to provide coking chambers therebetween and mounted for movement in a circular path, means for providing a heating zone and a carbonizing zone for said movable walls, said zones comprising portions of said circular path, said walls having a gap therein at the final end of the carbonizing zone traversed by said walls, means for advancing portions of at least some of said walls across said gap and means for pushing coke from between the wall portions while they are being moved across said gap.

4. Coking apparatus comprising a series of concentric annular walls spaced to provide a series of annular coking chambers therebetween and mounted for movement in a circular path, said walls having a gap therein, means for advancing portions of said walls successively across said gap, and coke-pushing means for removing coke from the wall portions while they are crossing said gap.

5. Coking apparatus comprising a series of concentric annular walls spaced to provide vertical coking chambers therebetween, means for rotating said walls, and means rotatable with said walls for closing the bottoms of said coking chambers during a portion only of its path of rotation.

6. Coking apparatus comprising a series of vertical walls horizontally spaced to provide coking chambers therebetween, means for rotating said walls through a heating zone and a carbonizing zone, said heating zone having an enclosure, bottom closure members movable in operative position with said walls through said carbonizing zone but separated therefrom when the walls are in the heating zone.

7. Coking apparatus comprising a series of vertical walls horizontally spaced to provide coking chambers therebetween, means for rotating said walls through a heating zone and a carbonizing zone, said heating zone having an enclosure, movable bottom closure members for said coking chambers, supporting means for said closure members for causing them to pass under said enclosure while the corresponding portions of the walls are passing through said heating zone.

8. Coking apparatus comprising a series of vertical walls horizontally spaced to provide coking chambers therebetween, means for rotating said walls through a heating zone and a carbonizing zone, said heating zone having an enclosure, movable bottom closure members for said coking chambers, supporting means for said closure members for causing them to pass under said enclosure while the corresponding portions of the walls are passing through said heating zone and for thereafter causing said closure members to assume their operative positions.

9. Coking apparatus comprising a series of vertical walls horizontally spaced to provide coking chambers therebetween, means for actuating said walls in an endless path through a heating zone and a carbonizing zone, said heating zone having an enclosure, radially-extending and movably mounted bottom closures for said coking chambers and rotatable therewith, and means for causing said closures to move downwardly and under said enclosure during their rotation through the arc of the heating zone.

10. Carbonizing apparatus comprising a series of hanging heat-storage devices arranged in circles to provide annular concentric coking chambers, means for providing a heating zone and a coking zone, and means for actuating these devices continuously through said zones successively.

11. Coking apparatus comprising a series of vertical hanging walls arranged and horizontally spaced to provide a series of annular and concentric coking chambers, said walls being movable through a heating zone and a carbonizing zone, and means for sealing the portions of the walls in the heating zone from the portions in the carbonizing zone.

12. Coking apparatus comprising a series of vertical walls horizontally spaced to provide a series of coking chambers, said walls being mounted for movement through a heating zone and a carbonizing zone, and means for sealing the portions of the walls in the heating zone from the portions in the carbonizing zone, said sealing means comprising means for supplying a stream of granular material extending across the width of said series of walls.

13. Coking apparatus comprising a series of vertical walls horizontally spaced to provide a series of coking chambers, said walls being mounted for horizontal movement through a heating zone and a carbonizing zone, and means for sealing the portions of the walls in the heating zone from the portions in the carbonizing zone, said sealing means comprising means for supplying a downwardly flowing stream of coke dust for filling each of said coking chambers at points on opposite sides of said heating zone.

14. Coking apparatus comprising a plurality of concentric annular walls spaced to provide coking chambers therebetween, means for rotating said walls, means adapted to heat said walls by supplying hot gases for passage through said coking chambers at one portion of the paths of movement of said walls, said portion constituting a heating zone, and means for sealing the portions of the coking chambers in said heating zone from the remaining portions of said chambers.

15. Coking apparatus comprising a plurality of concentric annular walls spaced to provide coking chambers therebetween, means for rotating said walls, means adapted to heat said walls by supplying hot gases for passage through said coking chambers at one portion of the paths of movement of said walls, said portion constituting a heating zone, and means for sealing the portions of the coking chambers in the heating zone from the remaining portions of said chambers, said sealing means comprising means for supplying columns of granular material to said coking chambers at their tops and adjacent to the ends of the heating zone.

16. Carbonizing apparatus comprising a series of vertical hanging heat-storage elements horizontally spaced to provide annular concentric carbonizing chambers therebetween, and means for moving said elements in a horizontal circular path.

17. Coking apparatus comprising movable vertical walls and coking chambers therebetween, means for heating said walls, means for supplying coal to said chambers to be coked, means for removing coke from said chambers and reciprocable means movable transversely of the path of movement of said walls for collecting the coke thus removed.

18. Coking apparatus comprising movable vertical walls and coking chambers therebetween, means for heating said walls, means for supplying coal to said chambers to be coked, means for removing coke from said chambers, members movable with said walls for receiving said coke and coke-scraping devices for removing said coke from said receiving means.

19. Coking apparatus comprising a series of vertical hanging walls of heat-storage devices that are arranged in circles and spaced radially to provide coking chambers therebetween, said devices being suspended at their tops and each of said devices in the inner walls of the series comprising a series of units connected for relative movement and each of said devices in the outer walls of the series being of rigid construction for resisting lateral movement.

20. Coking apparatus comprising a series of vertical hanging walls of heat-storage devices that are disposed in circles and spaced radially to provide annular concentric coking chambers therebetween, each of the inner walls of the series consisting of a row of oblong heat-storage devices parts of which are laterally movable and each of the outer walls of the series consisting of a row of similar devices of rigid construction for resisting lateral movement.

21. Coking apparatus comprising a series of vertical hanging walls of heat-storage devices that are disposed in concentric circles and spaced radially to provide annular coking chambers therebetween, said walls comprising beams transverse thereto for supporting said heat-storage devices, bracing members for the heat-storage devices of the outer walls of the series whereby the latter are rigid for resisting lateral movement, and cooling means for said beams and said bracing members.

22. Carbonizing apparatus comprising heat-storage devices, enclosing means for sealing said devices from the atmosphere, supporting means for said devices having portions extending through said sealing means and means for engaging said portions to shift the relative positions of said devices.

23. Carbonizing apparatus comprising two rotatable concentric girders, beams supported by said girders, heat-storage devices suspended from said beams and spaced to provide annular concentric coking chambers therebetween and means for providing a heating zone and a carbonizing zone for said devices and through which zones the devices are carried by said girders.

24. Carbonizing apparatus comprising two rotatable concentric girders having notches therein, beams extending radially therebetween and supported thereby in said notches, heat-storage devices suspended from said beams, and means for transferring a beam from one to another set of notches.

25. Carbonizing apparatus comprising a series of spaced hanging heat-storage elements, means adapted to supply hot gases to the spaces between certain of said elements at the lower portions of the latter and means adapted to withdraw said gases from said spaces at similar portions of other of said elements.

26. Carbonizing apparatus comprising a plurality of hanging members spaced to provide coking chambers therebetween, bottom closures for said chambers, and means for initially supplying a relatively small amount of material to be carbonized for retaining the lower ends of said members in vertical alinement and for thereafter supplying to said chambers the relatively large remainder of the material to be carbonized therein.

27. Coking apparatus comprising a series of heat-storage bodies having spaces therebetween to provide coking chambers, said bodies being movable through a heating zone and a carbonizing zone and means for sealing the bodies in the heating zone from those in the carbonizing zone, said sealing means comprising means for supplying a flowing stream of coke dust for filling each of said spaces at points intermediate of the said zones.

In testimony whereof, I have hereunto subscribed my name this 5th day of January, 1929.

FRANZ PUENING.